UNITED STATES PATENT OFFICE.

WILLIAM A. FAIRBURN, OF SHORT HILLS, NEW JERSEY, ASSIGNOR TO THE DIAMOND MATCH COMPANY, OF CHICAGO, ILLINOIS, A CORPORATION OF ILLINOIS.

APPARATUS FOR MODIFYING AIR.

1,127,419.

Specification of Letters Patent.

Patented Feb. 9, 1915.

Application filed October 31, 1913. Serial No. 798,484.

*To all whom it may concern:*

Be it known that I, WILLIAM A. FAIRBURN, a citizen of the United States, and resident of Short Hills, in the county of Essex and State of New Jersey, have invented certain new and useful Improvements in Apparatus for Modifying Air, of which the following is a specification.

This invention relates to an apparatus for modifying air as to its hygrometric condition. It has reference, more especially, to means whereby atmospheric air may be either humidified or dehumidified to adapt it to specific requirements, as, for example, the drying and tempering of the composition heads of friction matches.

In the preferred form of embodiment of my invention herein illustrated, humidifying and dehumidifying structures are associated, and provisions are afforded whereby atmospheric air may be subjected to the action of either or both structures, as desired, preparatory to the introduction of the air to the match room, &c. The dehumidifying structure possesses important features of construction and operation whereby the incoming air is subjected to the efficient action of progressing dehydrating material, such, for example, as calcium chlorid.

The invention also comprises various other novel features of construction and combinations of parts whereby advantages are secured, as will be hereinafter described and claimed.

Figure 1:
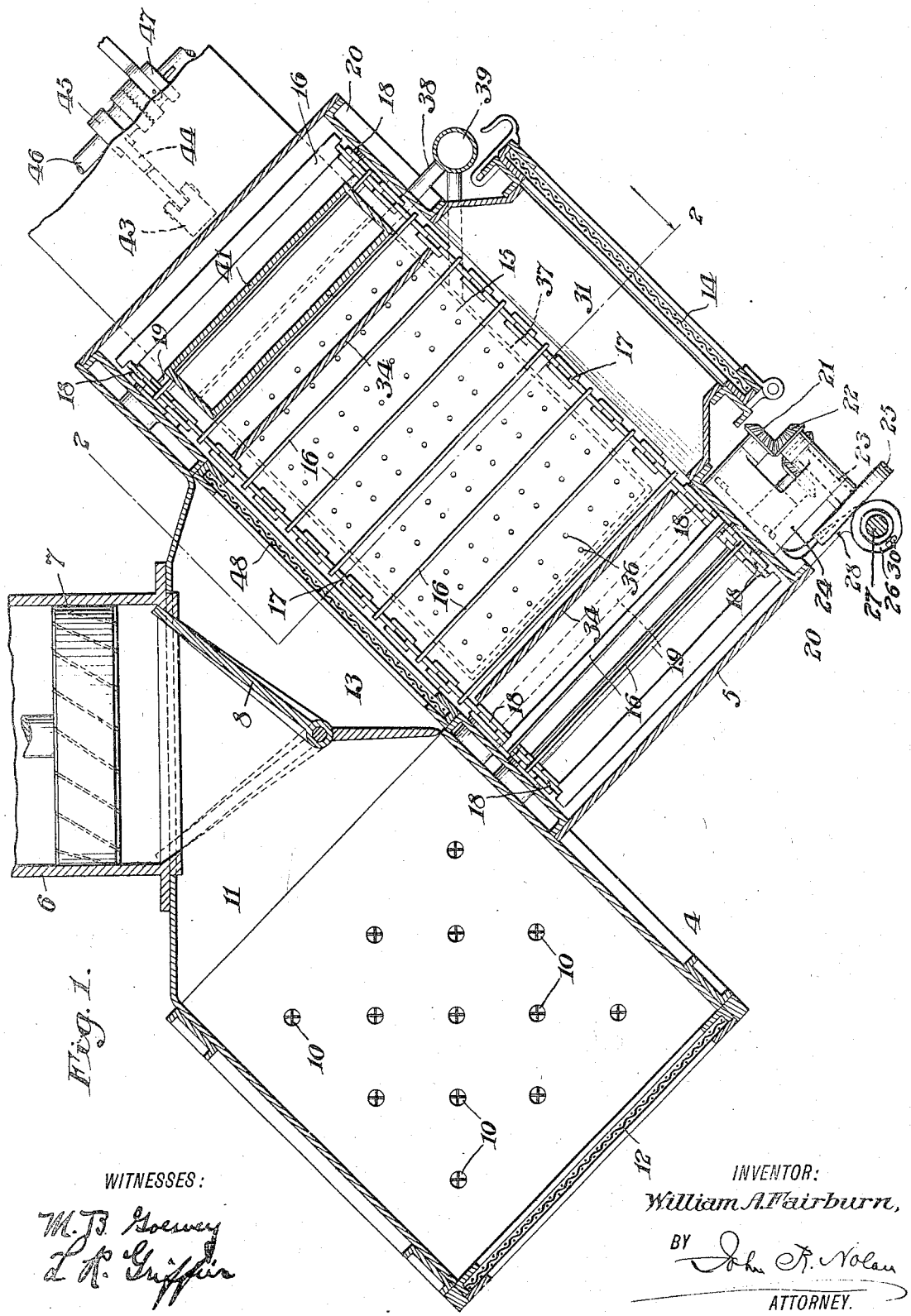
Figure 2:
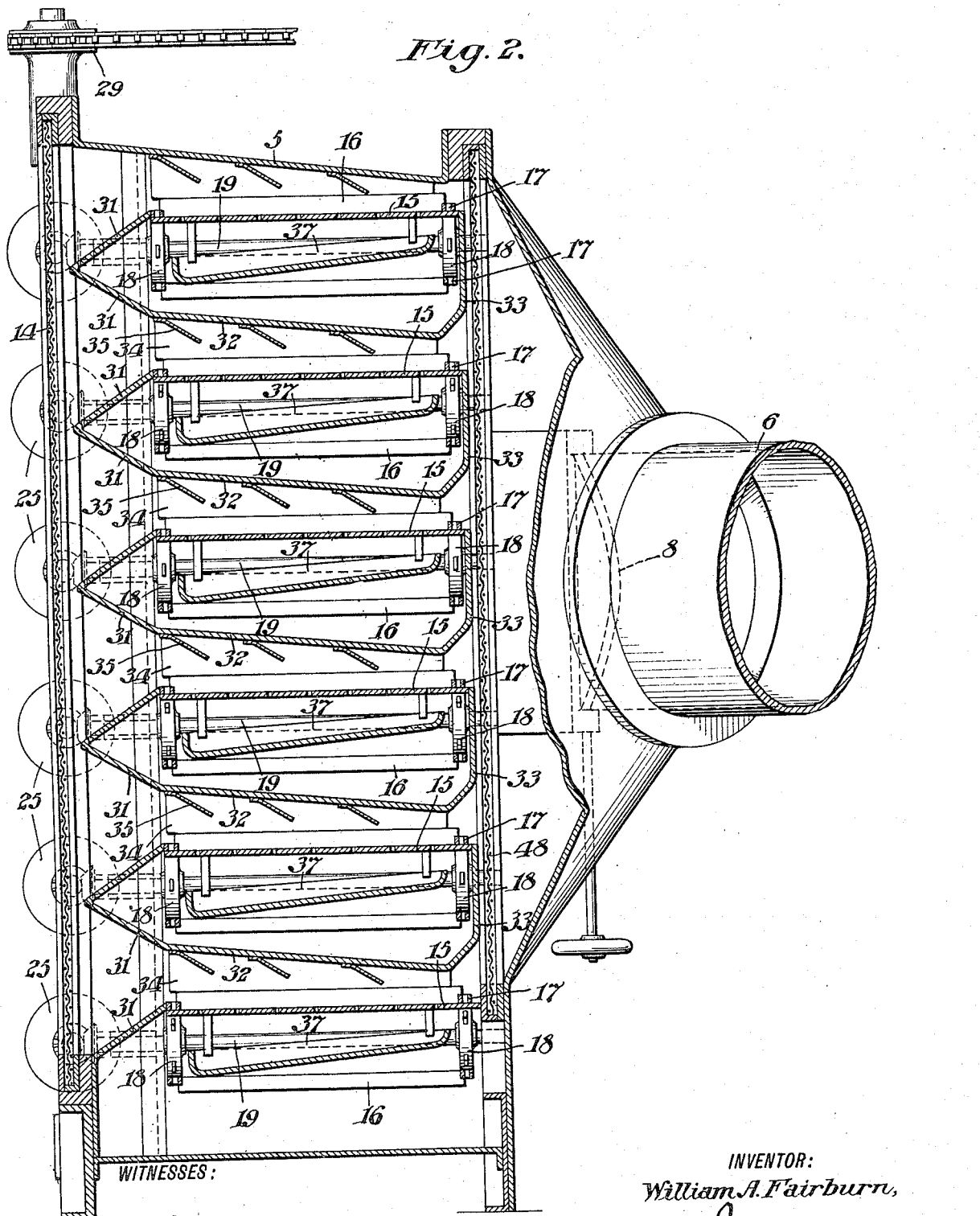
Figure 3:
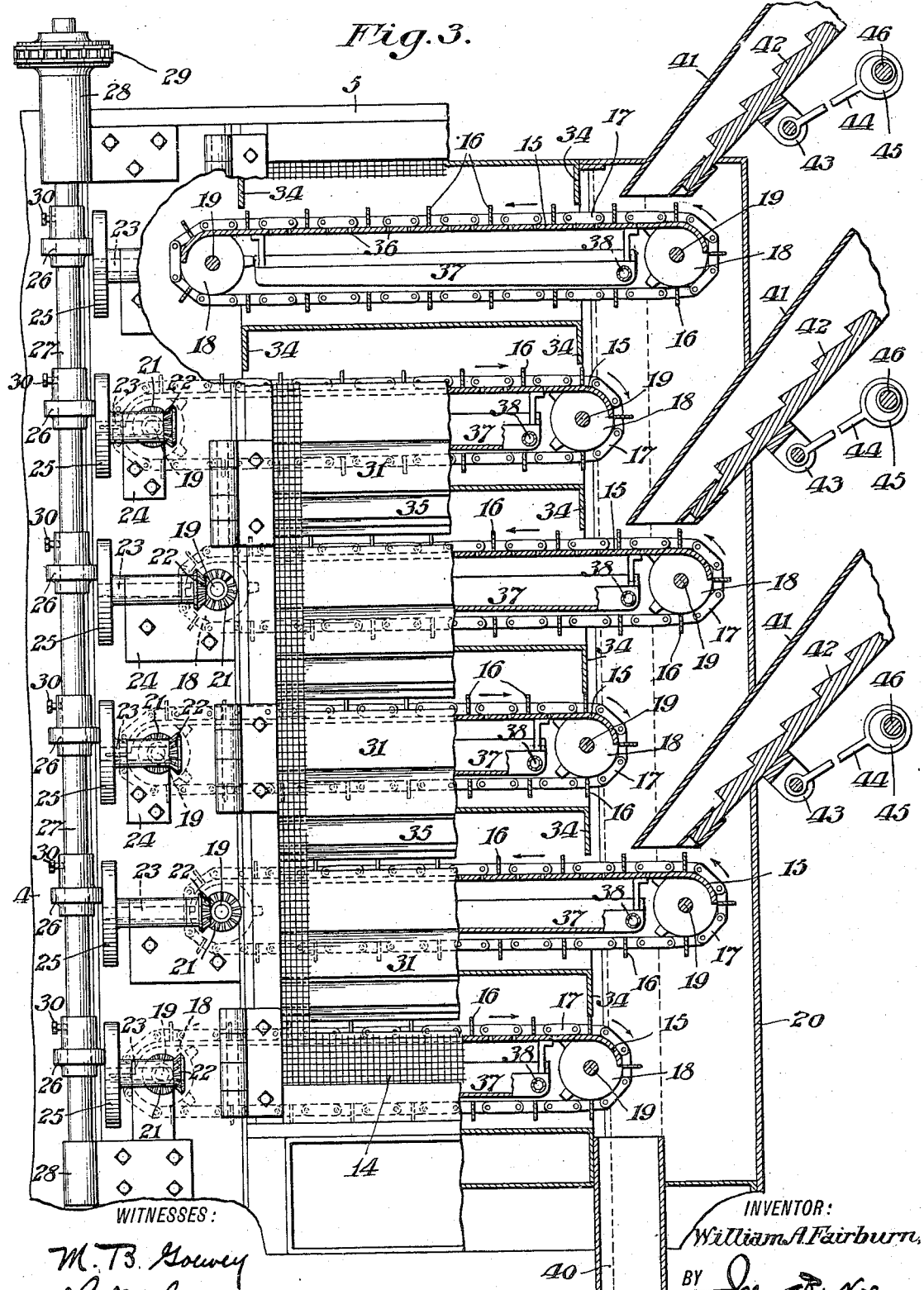
Figure 4:
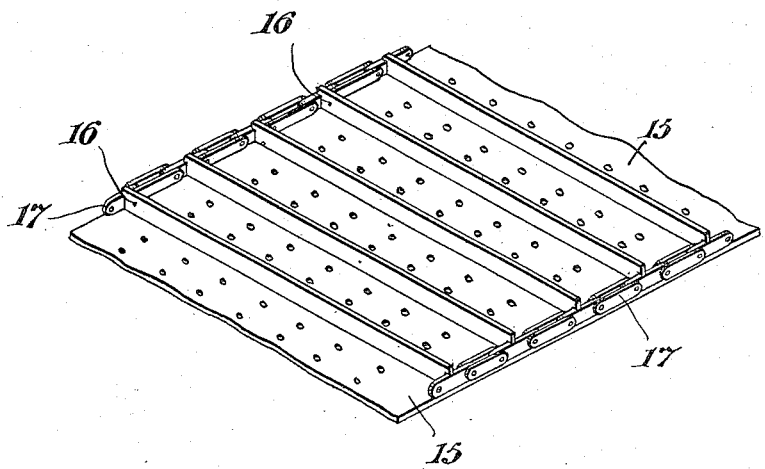
Figure 5:
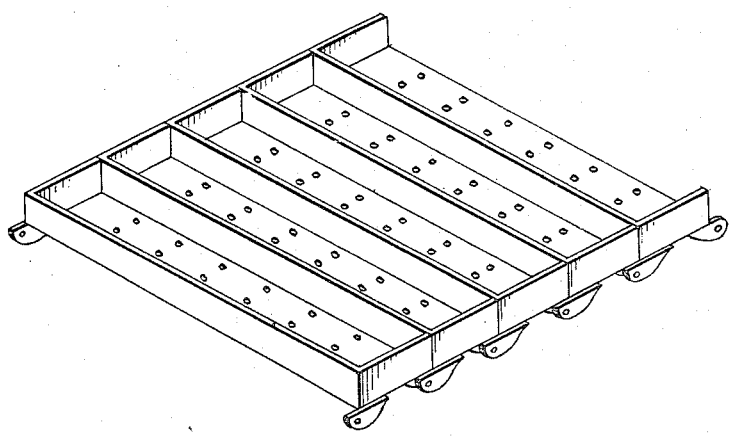

In the drawings—Figure 1 is a horizontal section through an air-modifying apparatus embodying my invention. Fig. 2 is a longitudinal vertical section through the air dehumidifying structure, as on the line 2—2 of Fig. 1. Fig. 3 is a front elevation, partly in vertical section, of the dehumidifying structure. Fig. 4 is a perspective view of a portion of the endless conveyer and its stationary perforated bed. Fig. 5 is a similar view showing a modified form of the endless conveyer wherein the bed is constituted by the bottoms of hingedly connected link receptacles.

4 designates the air-humidifying structure; 5 the air-dehumidifying structure; 6 an air trunk or conduit leading to the match room, or other place to be supplied with the conditioned air; 7 an exhaust fan in said trunk or conduit, and 8 a valve whereby either or both structures may be placed in communication with the trunk or conduit as the hygrometric condition of the atmosphere may require.

The humidifying structure in the form illustrated comprises a capacious casing within which is contained a series of vertically-disposed vapor, spray or atomizing nozzles 10. To the action of the vapor, &c., projected from these nozzles the air is subjected in its passage through the casing. The outer side of the casing is open for the ingress of air, and the opposite side is provided with a tapering outlet portion 11 leading to the air trunk or conduit 6. The inlet is preferably furnished with a wire screen or netting 12 to preclude the entrance of foreign matter to the interior of the casing.

The dehumidifying structure in the form illustrated comprises a rectangular casing open on its outer side for the inflow of air, and provided on its opposite side with a tapering outlet portion 13 leading to the air-trunk or conduit. The outlets of the two structures diverge toward the air trunk and the valve 8 is pivoted at the juncture of the outlets so that the latter may be opened or closed, as above-mentioned. The inlet of the dehumidifying structure is also preferably furnished with a protective screen or netting 14.

Supported within the dehumidifying chamber in spaced relation to each other are horizontal beds 15 which are adapted to receive calcium chlorid, or other dehydrating material; and means are provided whereby said material is slowly moved along the respective beds in such a manner that the air in its travel through the chamber is subjected to the efficient dehydrating action of the material. In the present instance the progress of the material along the respective beds is accomplished by endless conveyers, each of which comprises a series of spaced blades 16 carried by parallel chains 17 passing about sprocket wheels 18 on transverse shafts 19 journaled in bearings in the frame posts 20 of the structure 5. As most clearly illustrated in Fig. 3, the beds are arranged in staggered relation to each other, and the successive conveyers are arranged to travel in opposite directions to each other, whereby material delivered to one bed is carried along thereon and discharged therefrom upon the receiving end of the next succeeding bed and then advanced to the opposite end of the latter and discharged upon the receiving end of the next bed, and so on.

Any suitable means for actuating the conveyers may be employed. In the present illustration the shafts 19 at one end of the structure 5 are extended outward and the extensions are equipped with bevel wheels 21 which mesh with similar wheels 22 on short shafts 23 journaled in bearing brackets 24 on the adjacent post 20. The bevel gear wheels of the successive shafts are oppositely-disposed in order that when the shafts 23 are concurrently driven in the same direction the successive conveyer shafts 19 are driven in opposite directions to each other. The shafts 23 bear friction disks 25 with the faces of which respectively co-act friction wheels 26 on a vertical driving shaft 27 having its bearings in brackets 28 on the adjacent post 20. This shaft 27 is provided at one end with a sprocket or other gear 29 which is operatively connected with a suitable source of power. The friction wheels 26 are sleeved on the shaft 27 so as to be adjustable thereon radially of the respective friction disks 25, and set-screws 30, or the like, are provided to secure the wheels 26 in predetermined positions of adjustment. Thus the wheels 26, or any of them, may be independently adjusted in respect to the disks, and the relative speed of the conveyers, or any of them, may be varied as the relative velocity and the temperature and comparative humidity of the incoming air, at the different planes or levels, may require.

As a simple and efficient means to direct the incoming air to and across the paths of the progressing dehydrating material on the respective beds, I provide inclined deflecting surfaces 31 at the inlet portion of the chamber, and I also preferably continue the lower surface member across the chamber, as at 32, and bend it upward, as at 33, at the exit portion of the chamber. I also preferably provide the lower member with depending walls 34 which extend to or near to the path of the conveyer blades, and also with a series of inclined deflectors 35. Thus the incoming air is caused to flow in direct contact with and in proximity to the slowly progressing dehydrating material on the respective beds.

The beds are preferably foraminated, as indicated at 36, in order to permit the liquefied material on the beds to escape therefrom into drip pans 37 beneath the beds, which pans are connected by means of pipes 38 with a common discharge pipe 39. Adjacent the discharge end of the lowermost bed is a vertical conduit 40 into which the saturated dehydrating material is discharged.

Any suitable means for supplying the dehydrating material to one or more of the beds may be employed. In the present instance the material is supplied to the receiving end of alternate beds by means of inclined feed passages 41 leading into the dehumidifying chamber from a suitable hopper (not shown). Each of these feed-passages is furnished preferably with a vibratory transversely-toothed bottom 42 by the action of which the material can be freely delivered. The bottom is provided on its under side with a bracket 43 to which is pivotally connected the rod 44 of an eccentric 45 loosely mounted on a power driven shaft 46. This shaft is equipped with a suitable clutch 47 by actuation of which the eccentric head may be made fast or loose on the shaft, as desired. Thus any or all of the feed devices may be rendered active or idle as the requirements of the incoming air may demand.

I preferably cover the mouth of the discharge opening of the dehumidifying chamber with wire netting 48, or the like, in order to preclude the accidental passage of the dehydrating material to the fan.

If desired the conveyer may comprise an endless chain of hingedly connected link-like receptacles having perforated bottoms, as illustrated in Fig. 5, in which case, of course, the stationary bed will be omitted.

I claim—

1. In an apparatus for modifying air, an air humidifying structure comprising a chamber having vapor or spray devices therein, an air dehumidifying structure comprising a chamber adapted to contain dehydrating material, a common air outlet for the two chambers, and valve means for determining the communication of the respective chambers with said outlet.

2. In an apparatus for modifying air, a structure comprising a casing having air inlet and outlet portions, deflecting surfaces arranged within said casing to deflect the air along different horizontal paths, and means for progressively feeding dehydrating material across the paths of the air flowing through said structure.

3. In an apparatus for modifying air, a structure comprising a casing having air inlet and outlet portions, means for progressively feeding dehydrating material in different horizontal planes in the path of the air flowing through said structure, and air-deflecting surfaces alternating with said feeding means.

4. In an apparatus for modifying air, a structure comprising a casing having air inlet and air outlet portions, means for progressively feeding dehydrating material in different horizontal planes in the path of the air flowing through said structure, and means for independently regulating the speed at which the material is fed in the respective planes.

5. In an apparatus for modifying air, a structure comprising a casing having air inlet and outlet portions, means for progressively feeding dehydrating material within said casing in different horizontal planes, air deflecting surfaces alternating with the feeding means and means for independently supplying said material to the different planes.

6. In an apparatus for modifying air, a structure comprising a casing having air inlet and outlet portions, means for progressively feeding dehydrating material in different horizontal planes within the casing, drains beneath the respective feeding means, and means whereby the inflowing air is directed to and across the path of said material.

7. In an apparatus for modifying air, a structure comprising a casing having air inlet and outlet portions, and feeding means including a series of superposed endless conveyers for progressively feeding dehydrating material across the path of the air flowing through said structure, and air-deflecting surfaces alternating with said conveyer.

8. In an apparatus for modifying air, a structure comprising a casing having air inlet and outlet portions, feeding means including a series of superposed endless conveyers for progressively feeding dehydrating material across the path of the air flowing through said structure, and means for supplying said material to alternate conveyers.

9. In an apparatus for modifying air, a structure comprising a casing having air inlet and outlet portions, feeding means including an endless conveyer for progressively feeding dehydrating material through said structure, a drain beneath said conveyer, and means whereby the inflowing air is directed to and across the path of the said material.

10. In an apparatus for modifying air, a structure comprising a casing having air inlet and outlet portions, feeding means including a series of superposed endless conveyers for progressively feeding dehydrating material within said structure, and deflecting surfaces arranged to deflect the inflowing air to and across the paths of the material on said conveyers.

11. In an apparatus for modifying air, a structure comprising a casing having air inlet and outlet portions, feeding means including a series of superposed endless conveyers for progressively feeding dehydrating material within said structure, means for supplying said material to the conveyers, drains beneath the respective conveyers, and a common discharge passage for said drains.

12. In an apparatus for modifying air, a structure comprising a casing having air inlet and outlet portions, a perforated bed within said casing, a conveyer traversing said bed, means for supplying dehydrating material to said bed, and a drain beneath said bed.

13. In an apparatus for modifying air, a structure comprising a casing having an air inlet and outlet, a series of perforated beds arranged one above another in staggered relation to each other, conveyers traversing the said beds successively in opposite directions to each other, means for supplying dehydrating material to a bed or beds, and drains beneath the respective beds.

Signed at New York in the county and State of New York this 30th day of October A. D. 1913.

WILLIAM A. FAIRBURN.

Witnesses:
B. CHANDLER SNEAD,
ROSCOE C. PECK.